United States Patent
Walton et al.

(10) Patent No.: US 7,032,760 B2
(45) Date of Patent: *Apr. 25, 2006

(54) BACKWASH FLUSHING FILTER

(75) Inventors: Frank A. Walton, Ft. Worth, TX (US); James Allen Mann, Jr., Anna, TX (US); James E. Williams, Richardson, TX (US)

(73) Assignee: Dosmatic USA, Inc., Carrollton, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 10/942,685

(22) Filed: Sep. 16, 2004

(65) Prior Publication Data

US 2005/0121382 A1    Jun. 9, 2005

Related U.S. Application Data

(63) Continuation-in-part of application No. 10/728,479, filed on Dec. 5, 2003.

(51) Int. Cl.
*B01D 21/24* (2006.01)
*B01D 24/38* (2006.01)
*B01D 29/88* (2006.01)
*B01D 33/70* (2006.01)
*B01D 35/00* (2006.01)

(52) U.S. Cl. .................. 210/425; 210/423; 210/232; 210/427

(58) Field of Classification Search ............... 210/238, 210/232, 450, 429, 278, 425, 424, 422, 390, 210/385, 302, 418
See application file for complete search history.

(56) References Cited

U.S. PATENT DOCUMENTS 3,513,981 A * 5/1970 Mendelow .................. 210/411
3,834,537 A * 9/1974 Brett .......................... 210/136
4,652,369 A * 3/1987 DePolo et al. .............. 210/169

* cited by examiner

*Primary Examiner*—W. L. Walker
*Assistant Examiner*—Yoon-Young Kim
(74) *Attorney, Agent, or Firm*—Scott L. Harper; William Wang; Carstens & Cahoon, LLP

(57) ABSTRACT

An inline backwash, flushing filter assembly comprising a header assembly, a rotatable valve assembly, and a filter element assembly disposed within a filter housing assembly. In operation, the controller moves the turn knob of the rotatable valve assembly a one-quarter turn which results in the reversal of fluid flow through the assembly to periodically back flush the filter utilizing fluid from the system inlet. Debris removed from the filter element during the backwash process are immediately discharged from the system through a drain port. Simultaneously, the hydraulic shearing mechanism of the backwash process dislodges and drains debris which may have accumulated on the screen and at the bottom of the lower filter assembly during normal filter operations. The controller then returns the filter assembly to filtration operation by a reverse one-quarter turn of the turn knob of the rotatable valve assembly.

3 Claims, 5 Drawing Sheets

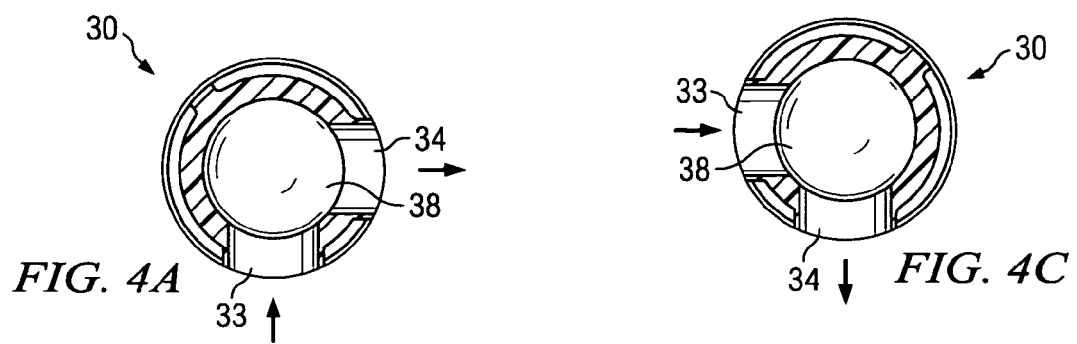
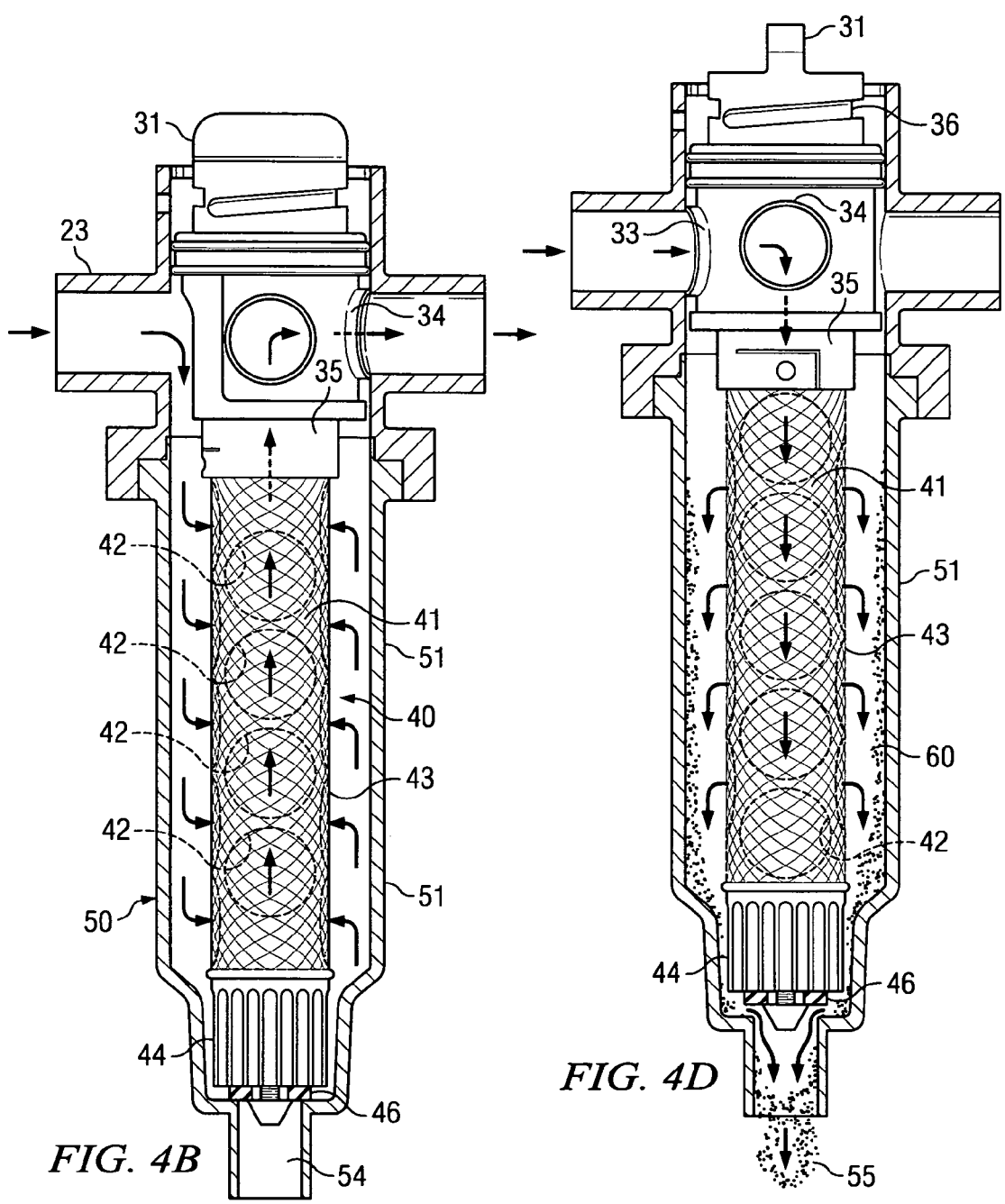
*FIG. 4A*
*FIG. 4C*
*FIG. 4B*
*FIG. 4D*

BACKWASH FLUSHING FILTER

CROSS REFERENCE TO RELATED APPLICATION

This application is a continuation-in-part of co-pending U.S. patent application Ser. No. 10/728,479, filed on Dec. 5, 2003, the disclosure of which is incorporated herein by reference.

BACKGROUND OF THE INVENTION

1. Technical Field

The present invention relates to an apparatus and method for improving the cleaning operation of an inline filter and, more specifically, for the backwash and flushing of the filter element and filter assembly without taking the filter assembly offline for a prolonged period and does not require any special tools or skills to operate.

2. Description of Related Art

Filters are commonly used to remove particulates and undesired solids from a fluid medium. A common filtration process involves passing a fluid through a filter medium. Solids are retained on the filter medium, while the fluid passes through the filter medium and continues down stream. However, as solids begin to accumulate on the filter media, the differential pressure across the filter medium increases and consequentially the fluid flow rate decreases. Likewise, the solids retained on the filter may slough due to gravitational force and begin to form a sediment which collects at the lower end of the filter assembly which further decreases the efficiency of the filtration system.

In order to return the filter and the system to peak operating efficiency, the solids which are retained by the filter must be removed from the filter, along with the sedimentation located at the bottom of the filter assembly. A common method of filter particulate removal is known as "backwashing" wherein the filter is taken offline, and the flow of fluid through the filter element reversed. The principal of hydrodynamic shear removes the accumulated solids from the filter media. These solids which have now become suspended in the backwash fluid are then directed to a waste drain. Depending on the location of the waste drain port located on the filter assembly, the sediments which have collected at the bottom of the filter assembly either remain or inhibit the flow of the backwash waste water. As such, the lower filter assembly usually requires manual cleaning by the operator, which increases the time the filter system is offline and out of operation. Once the filter media and filter assembly are cleaned, the filter system is then placed back into operation until the next backwashing is desired or required.

Unfortunately, most filtration backwash systems require the filter to be taken offline and placed out of service while the backwash operation is performed. This is due, in part, to the consistent design of filtration systems wherein the filter assembly does not provide an efficient mechanism for removing sedimentary solids which have accumulated at the bottom of the filter assembly. Moreover, most prior art backwash systems require a secondary piping system dedicated solely to the backwashing process whereby backwash water is introduced and circulated in the opposite direction of normal, operational fluid flow for purposes of removing the accumulated solids on the filter media.

In view of the drawbacks which exist in the prior art, a need exists for an improved filter backwash apparatus that provides the ability to backwash the filter media without requiring that the filter be taken offline for an extended period of time. Similarly, a need exists in the art for an improved filter backwash apparatus which can provide a quick, efficient flushing mechanism to remove sedimentary solids which have accumulated in the filter assembly.

Accordingly, it is an object of this invention to provide a back washable filter assembly which does not require the cessation of filter operations for an extended period of time during the backwashing process. It is further an object of this invention to provide a back washable filter system that does not require a secondary piping system dedicated to backwashing operations. It is further an object of this invention to provide a back washable filter assembly that incorporates an efficient flushing mechanism which results in the removal of solids from the filter media and the removal of sedimentary solids which have collected at the bottom of the filter assembly. It is further an object of this invention to perform these multiple functions in a single, one-quarter turn movement to initiate the backwash process, and to return to normal filter operations in a reverse single, one-quarter turn movement. It is a further object of this invention to provide a backwash, flushing filter with a unique flat seal around the inlet and outlet ports to minimize fluid "blow-by" during filter and backwash operations. It is further an object of this invention to provide a unique application of a dual tab-lock and sealing mechanism allowing for the operation and backwash operation of the filter unit disclosed herein without leakage between moving components. It is a further object of this invention to incorporate a unique mechanism for retaining a gasket seal located near the backwash fluid drain port which retains the seal in place during the fluid turbulence generated during backwash operations. It is a further object of this invention to incorporate a unique filter assembly design that utilizes a slot design to capture accumulated solids by reducing fluid turbulence and yet provide for effective backwash operations. Further objects of this invention will be apparent to persons knowledgeable with devices of this general type upon reading the following description and examining the accompanying drawings.

SUMMARY OF THE INVENTION

In accordance with the foregoing objects, the present invention—a self-cleaning, backwash flushing filter system—generally comprises a system inlet; a filter assembly, a backwash drain pipe and a filtered fluid outlet in selective fluid communication with the system inlet.

The preferred embodiment of the present backwash flushing filter assembly invention comprises a header assembly, a rotatable valve assembly, a filter element assembly, and a filter housing assembly. In a single operation, the controller moves the turn knob on the rotatable valve assembly a one-quarter turn to reverse the flow of fluid through the filter assembly, including the filter element assembly. Any debris removed from the filter element media during the backwash process are immediately discharged from the system through the drain port located in the bottom portion of the filter housing. The hydraulic shearing mechanism of the backwash fluid breaks up and dislodges any debris which have accumulated on the filter media and at the bottom of the filter assembly during normal filter operation, which are then removed from the filter assembly through the backwash drain port. The controller then returns the filter assembly operation to filtration operation by a reverse one-quarter turn of the turn knob, which again reverses the fluid flow through the filter assembly and normal filtration operation commences once again.

Many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings wherein:

FIG. 4A is a top cross-sectional view of the rotatable valve assembly shown in standard filter operation mode;

FIG. 4B is a profile cross-sectional view of the backwash flushing filter in standard filter operation;

FIG. 4C is a top cross-sectional view of the rotatable valve assembly shown in filter backwash operation mode;

FIG. 4D is a profile cross-sectional view of the backwash flushing filter in filter backwash operation mode;

DETAILED DESCRIPTION OF THE INVENTION

The preferred embodiment of the invention disclosed herein as shown in FIGS. 1–4D is a backwash flushing filter assembly 10 whereby switching from filtration mode to backwash flushing mode is performed by a one-quarter turn of the rotatable valve assembly and vice versa as discussed in further detail below.

Figure 1:
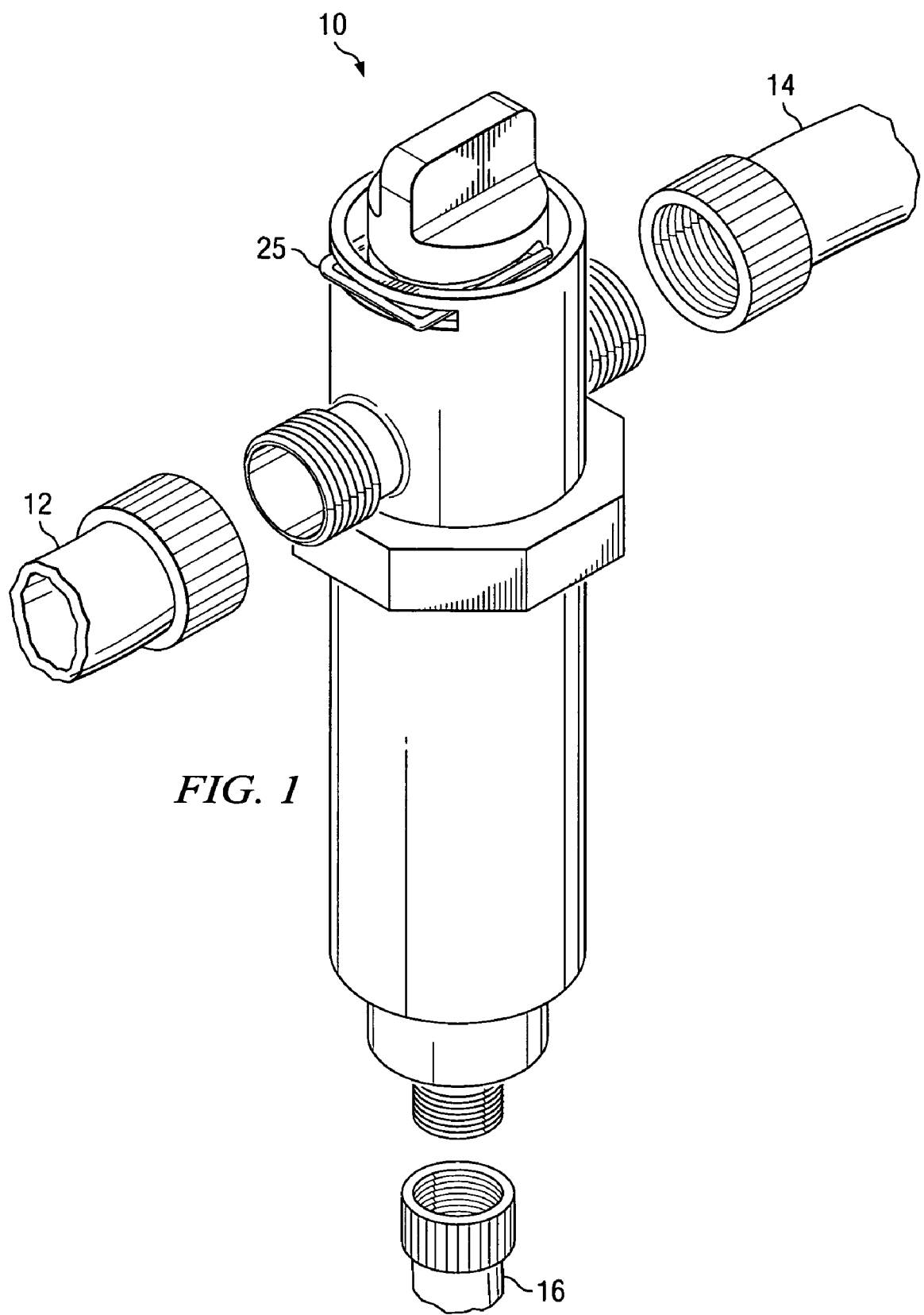
FIG. 1 is a perspective view of the backwash flushing filter assembly embodying the invention disclosed herein.

FIG. 1 depicts the assembled backwash flushing filter assembly 10 with connection points to a fluid source pipe 12, filtered fluid outlet pipe 14, and backwash drain pipe 16. The filter assembly 10 is preferably constructed so that the filter assembly 10 can be readily accessed to permit visual component inspection, filter media removal and replacement, if necessary. The filter assembly 10 can be constructed in a variety of sizes to accommodate both standard and custom filter element sizes and uses as known in the art.

Figure 2:
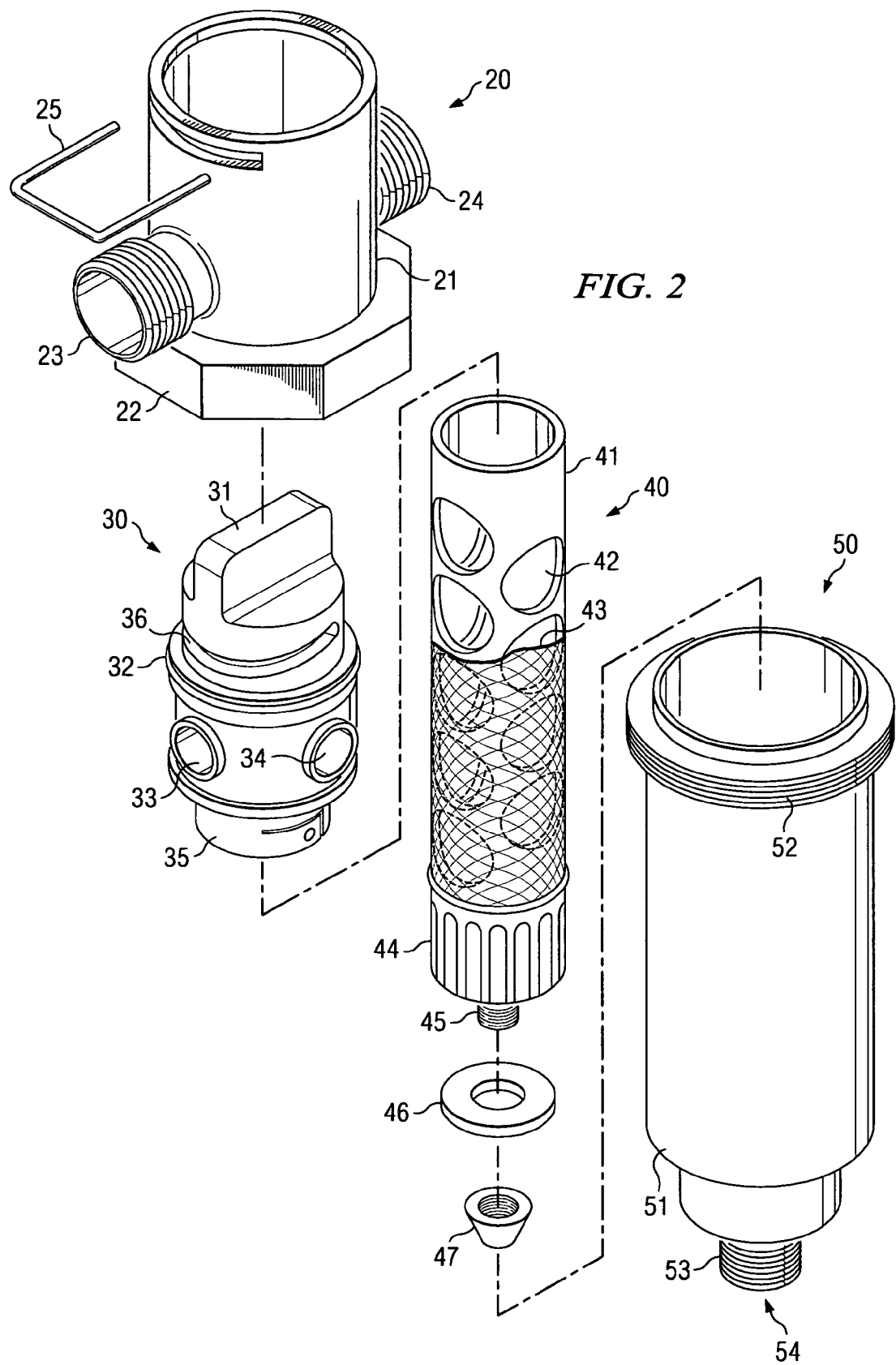
FIG. 2 is a fragmentary view of the components of the backwash flushing filter assembly embodying the invention disclosed herein.

Turning now to FIG. 2, the backwash flushing filter assembly 10 is shown in exploded view. Filter assembly 10 is comprised of a header assembly 20, a rotatable valve assembly 30, a filter element assembly 40, and a filter housing assembly 50. In further detail, the header assembly 20 is comprised of a cylinder cap 21 and cylinder base 22 which includes threaded connector means within the interior circumference of cylinder base 22. A fluid inlet connect 23 is formed as part of cylinder cap 21 and provides for the inflow of fluid into the backwash flushing filter assembly 10. The filtered fluid outlet connect 24 is formed as part of cylinder cap 21 and is oriented, in the preferred embodiment, opposite of fluid inlet connect 23, although other configurations may be utilized depending on the application. Filter fluid outlet connect 24 provides an outlet for fluid that has been filtered by the filter assembly 10. Set clip 25 is removably inserted into and through the cylinder cap 21 via a preformed slot in cylinder cap 21 as shown. In this embodiment, set clip 25 is utilized to retain the rotatable valve assembly 30, described in detail below, within the header assembly 20 during filter and backwash operations. An alternative embodiment of the present invention may include one or more independent pins which are inserted through preformed holes in the cylinder cap 21 as the retention mechanism for the rotatable valve assembly 30. Likewise, additional means for securing the rotatable valve assembly within the header assembly may include threaded screw-type connections, tongue-in-groove connections and locking tabs in various orientations to accomplish the retention objective and allowing for the insertion and removal of the rotatable valve assembly 30 from the header assembly 20.

The rotatable valve assembly 30 includes a turn knob 31, two seal gaskets 32, a backwash fluid inlet port 33, a filtered fluid outlet port 34, a top filter coupler 35, and a turn guide slot 36 which is preformed into the rotatable valve assembly 30 below the turn knob 31 as shown in FIG. 2. Rotatable valve assembly 30 includes an interior chamber 38 which during filter operations receives filtered fluid from the filter element assembly 40 and allows for the passage of filtered fluid to the fluid filter outlet port 34. During backwash mode, backwash fluid is delivered into the interior chamber 38 of the rotatable valve assembly 30 via backwash fluid inlet port 33 which then flows in the reverse direction down through the filter element assembly 40 and results in the backwashing of same. Seal gaskets 32 minimize fluid "blowby" when the filter assembly 10 is switched from filter operation to backwash operations and vice versa and also maintains segregation of the unfiltered inlet fluid, filtered fluid and backwash fluid during filter and backwash operations.

Filter element assembly 40 is comprised of a filter stalk 41, filter ports 42, filter media or mesh 43, lower filter coupler 44 with a threaded gasket stem 45, a gasket seal 46, and gasket cap 47. In the disclosed embodiment, filter stalk 41 is a cylindrical pipe having first and second open ends. The first or lower open end is sealably connected to lower filter coupler 44, while the second or upper open end is sealably connected to the interior cavity of the rotatable valve assembly 30 via the top filter coupler 35 and releasably locked into place by locking tabs or pin 37. Gasket seal 46 is releasably connected to lower filter coupler 44 by placement around gasket stem 45 and retained by screwing on gasket cap 47 via the threaded exterior of gasket stem 45. Alternative embodiments of the filter element assembly may include a barb gasket stem, instead of a threaded gasket stem, which allows the user to simply slip gasket seal 44 over the barbed end of the gasket stem which thereby retains the gasket seal 44 in a secured position. Additional connection means for retaining gasket seal 44 to gasket stem 45 maybe employed as required by the particular application or operating environment. Filter element assembly 40 is thereby releasably secureable within filter housing assembly 50. The lower filter coupler 44 may also include preformed slots or surface indentations which act to minimize fluid turbulence during filter operation mode, thereby aiding in the capture and sedimentation of accumulated solids at the bottom end of the filter assembly 50.

Filter housing assembly 50 is comprised of a filter housing 51, a header/filter body threaded connect 52, a backwash drain port connect 53, and a backwash fluid drain port 54. Filter housing assembly 50 is cylindrical in shape and, in the embodiment shown, is composed of a filter housing 51 with an open upper end and a lower end with a reduced diameter in appropriate relation to the diameter and length of filter element assembly 40. The lower end of filter housing assembly 50 includes a threaded backwash drain connect 53 and open backwash drain port 54 as depicted in FIG. 2.

Figure 3:
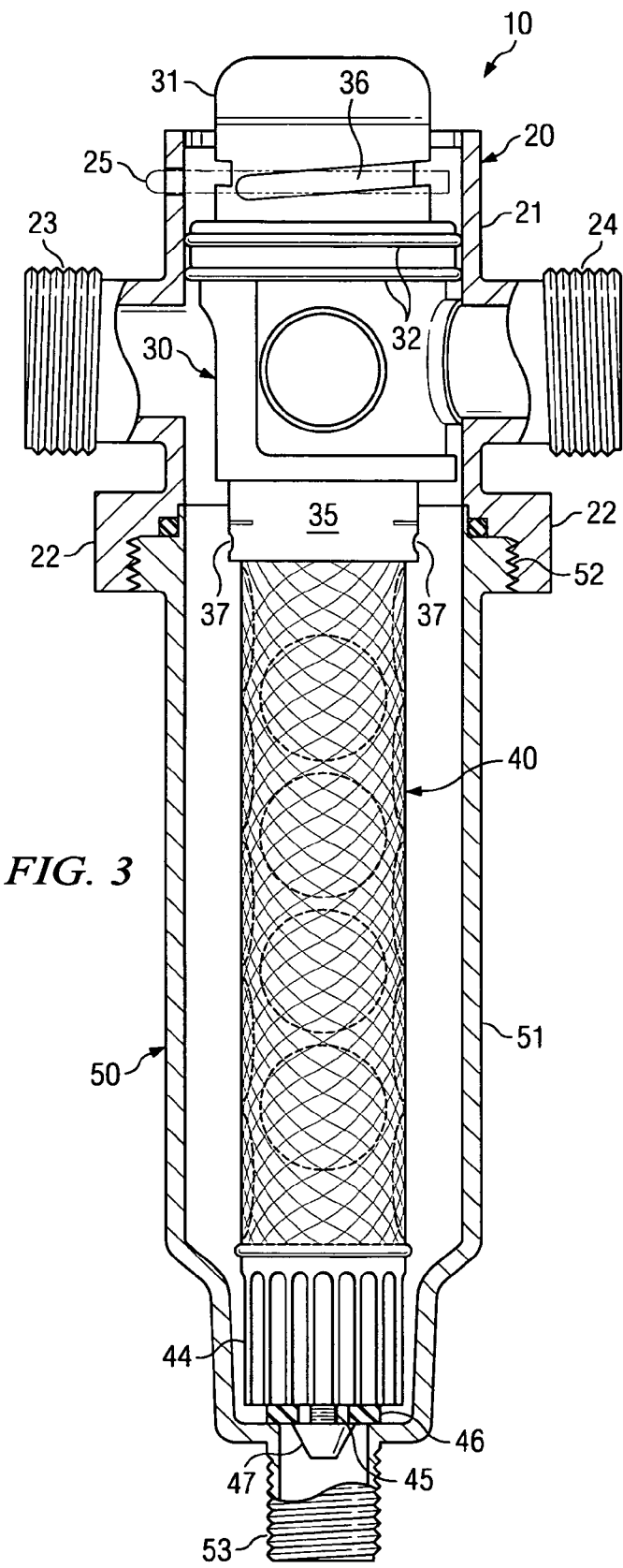
FIG. 3 is a profile cross-sectional view of the backwash flushing filter assembly shown in the assembled mode.

FIG. 3 shows an assembled version of the backwash flushing filter assembly 10. In the preferred embodiment, the rotatable valve assembly 30 is slidably disposed within the header assembly 20. Filter element assembly 40 is releasably attached to the rotatable valve assembly via locking tab 37. The filter housing assembly 50 is releasably secured to the header assembly 20 via threaded connects 52. After assembly in this manner, the filter assembly 10 is ready for placement in an operational environment.

A plurality of pipes may be connected to the filter assembly 10 for introducing fluids into and removing fluids from the filter assembly 10. In the present embodiment, a fluid source pipe 12 and a filter fluid outlet pipe 14 are connected to the filter assembly 10, via fluid inlet connect 23 and fluid outlet connect 24, respectively, so as to communicate with the interior of the header assembly 20, rotatable valve assembly 30, filter element assembly 40, and filter housing assembly 50. The fluid source pipe 12 is used to introduce an unfiltered inlet fluid to be filtered into the header assembly 20 and filter housing assembly 50 from an un-illustrated source, the filtered fluid outlet pipe 14 transports filtered fluid downstream, and the backwash drain pipe 16 is used to remove unwanted debris suspended in the backwash fluid from the filter element assembly 40 and filter housing assembly 50 via backwash drain port 54.

Turning to FIG. 4A, a cross-sectional top view of the rotatable valve assembly 30 is shown in the filtration mode position. In this view, regular filter operation is ongoing and the backwash fluid inlet port 33 is shown in the closed position and filter fluid outlet port 34 is shown in the open position. As shown in FIG. 4B, inflow fluid to be filtered enters the filter assembly 10 through fluid inlet connect 23 and circulates into the filter housing assembly 50 and contacts the filter element assembly 40. As the inflow fluid continues to circulate, suspended solids within the inflow fluid contact filter media 43. At this point, solids of a predetermined size are prevented from passing through filter media 43 while the newly filtered fluid then passes into and up through the filter stalk 41 via filter ports 42 due to the pressure differential between the incoming fluid from fluid source pipe 12 which is under a greater pressure than the fluid pressure present in the filtered fluid outlet pipe 14. Due to the hydraulic differential, the filtered fluid then moves into the interior cavity 38 of the rotatable valve assembly 30 and exits the interior cavity 38 via filter fluid outlet port 34 and into filter fluid outlet pipe 14. As the filtration process continues, suspended solid matter will begin to accumulate on filter media 43 and begin to form a sediment deposit at the bottom of the filter housing assembly 50 between the filter element assembly 40 and the filter housing filter housing 51. In turn, this causes the efficiency of the filtering process to decline to a point at which the controller initiates the filter backwash operation.

Turning to FIG. 4C, a cross-sectional top view of the rotatable valve assembly 30 is shown in the backwash mode position. In order to initiate backwashing operations, the rotatable valve assembly 30 is turned a one-quarter turn by manipulation of the turn knob 31. This causes the filter fluid outlet port 34 to be placed in the closed position and the backwash fluid inlet port 33 to be in the open position, which then results in connection with fluid inlet connect 23 which is in communication with fluid source pipe 12. Fluid is introduced via fluid source pipe 12 into the interior chamber 38 of the rotatable valve assembly 30 and proceeds down into the interior of the filter stalk 41. At the same time, due to the inclined slot 36 into which the set clip 25 is positioned, by turning turn knob 31 a one-quarter turn, the rotatable valve assembly 30 and filter element assembly 40 proceeds to move axially within the header assembly 20 and filter housing assembly 50, which results in the filter element assembly 40 being disconnected from sealed contact with the filter housing 51 via gasket seal 46 which results in the creation of a pressure differential between the fluid source pipe 12 and the backwash drain port 54. As a result, backwash fluid flows from the interior of filter stalk 41 via filter ports 42 and back through filter media 43. This reversal of fluid flow results in a hydraulic shearing mechanism by which suspended solids 60 are washed away from the filter media 43 and exit filter element assembly 40 via backwash drain port 54. Likewise, the reversal of fluid flow through the filter element assembly 40 creates a "flushing" action which erodes and removes, via backwash drain port 54, any sedimentary build up that has collected at the bottom of the filter housing assembly 50 between the filter element assembly 40 and the filter housing filter housing 51. During the backwashing cycle, the gasket seal 46 is securely held in place around the gasket stem 45 by gasket cap 47 thereby preventing the gasket seal 46 from becoming dislodged and blocking the backwash drain port 54 during backwash operations by the fluid turbulence generated during backwash operations.

After the backwash operation is complete, the controller turns turn knob 31 a reverse one-quarter turn. This results in the filter fluid outlet port 34 returning to the open position and the backwash fluid inlet port 33 to be placed in the closed position. Fluid to be filtered once again enters the filter assembly 10 through fluid inlet connect 23, circulates into the filter housing assembly 50 and contacts the filter element assembly 40 as previously discussed. At the same time, due to the inclined slot 36 into which the set clip 25 is positioned, by turning turn knob 31 a reverse one-quarter turn, the rotatable valve assembly 30 and filter element assembly 40 move axially in the reverse direction and enter into sealed contact with the filter housing 51 via gasket seal 46 which results in the creation of a pressure differential between the fluid source pipe 12 and the filtered fluid outlet pipe 14. The fluid then contacts the filter media 43 resulting in the removal of suspended solids and the filtered fluid then moves into the interior volume of the filter stalk 41, then into the interior chamber 38 of the rotatable valve assembly 30 and exits the rotatable valve assembly 30 via the filtered fluid outlet port 34.

An additional feature of the invention disclosed herein allows for the simple and quick removal and replacement of the filter media 43, without the need to remove the entire filter assembly 10 from the piping system. To change the filter media 43 or filter stalk 41, the user may simply shut off fluid communication to the filter assembly 10, pull set clip 25 out of the header assembly 20 and remove the rotatable valve assembly 30 and filter element assembly 40 from the filter housing assembly 50. The user can then remove, reinstall and/or change the filter media or an entire filter stalk as the need arises. The user then reassembles the filter assembly 10 in the reverse order of the steps outlined above, reinitiates fluid communication with the filter assembly 10 and resumes filter operations.

Figures 5, 6:
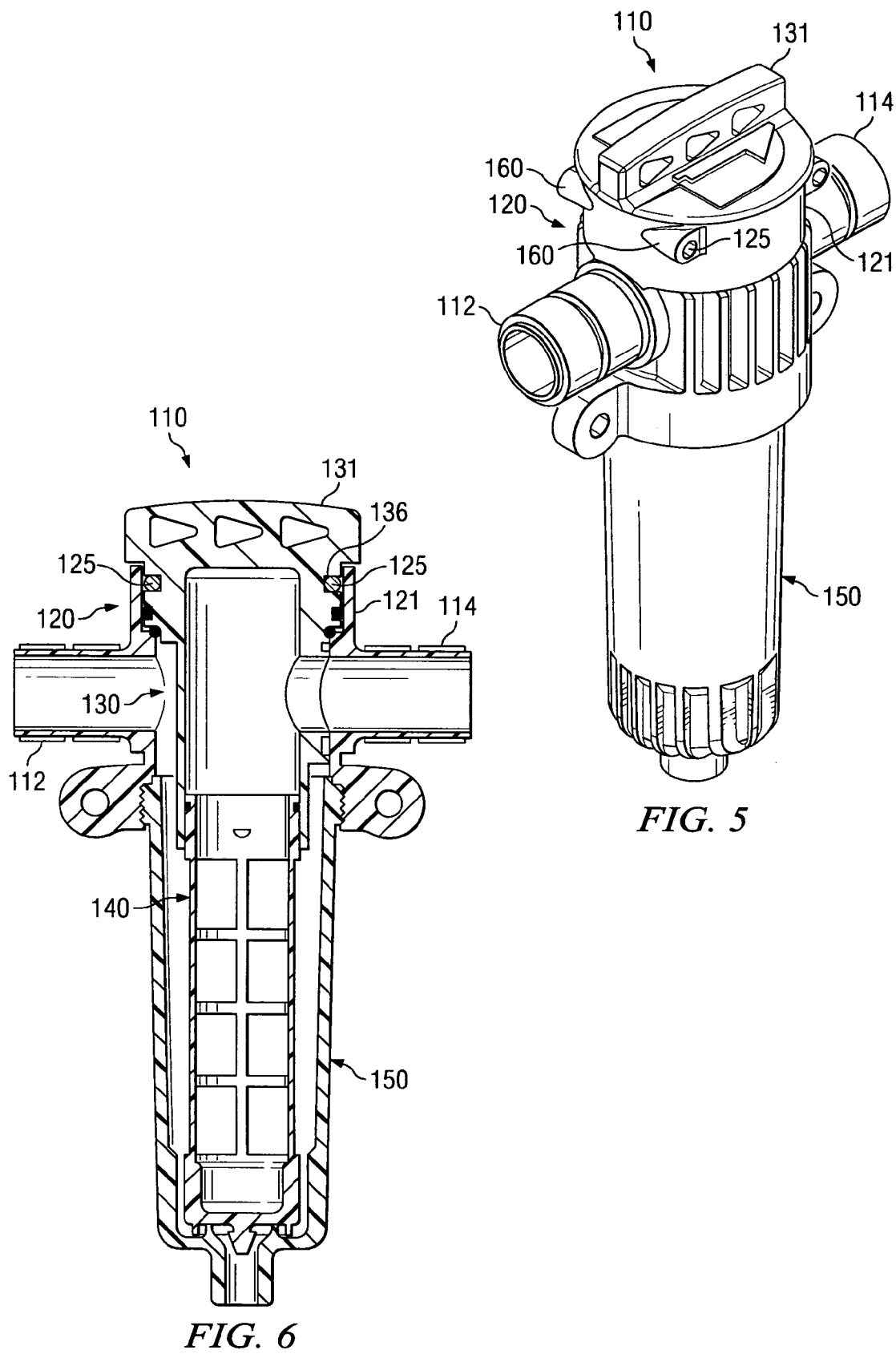
FIG. 5 is a perspective view of a backwash flushing filter assembly in accordance with another embodiment of the invention disclosed herein.
FIG. 6 is a profile cross-sectional view of the backwash flushing filter assembly of FIG. 5 shown in the assembled mode.

FIG. 5 is a perspective view of a backwash flushing filter assembly in accordance with another embodiment of the invention disclosed herein. FIG. 6 is a profile cross-sectional view of the backwash flushing filter assembly of FIG. 5 shown in the assembled mode. Like the filter assembly 10 shown in FIGS. 1 and 2, the filter assembly 110 shown in FIGS. 5 and 6 comprises a header assembly 120, a rotatable valve assembly 130, a filter element assembly 140, and a filter housing assembly 150. A fluid source pipe 112 directs fluid into a cylinder cap 121 of the header assembly 120, thereby providing an inflow of fluid into the backwash flushing filter assembly 10. A filtered fluid outlet pipe 114 of the cylinder cap 121 is oriented, in a preferred embodiment, opposite of the fluid source pipe 112, although other configurations may be utilized depending on the application. The filtered fluid outlet pipe 114 provides an outlet for fluid that has been filtered by the filter assembly 110. Rather than using a set clip 25 to retain the rotatable valve assembly 30 as shown in FIG. 3, an alternative embodiment of the present invention, as shown in FIG. 5, may include one or more independent pins 125 which are inserted through pin guides 160 in the cylinder cap 121 as the retention mechanism for the rotatable valve assembly 130. Likewise, additional means for securing the rotatable valve assembly within the header assembly may include threaded screw-type connections, tongue-in-groove connections and locking tabs in various orientations to accomplish the retention objective and allowing for the insertion and removal of the rotatable valve assembly from the header assembly.

Returning to FIGS. 5 and 6, each pin guide 160 has a longitudinal bore 136 to accommodate a set pin 125. If desired, the longitudinal bore 136 can be threaded to help retain a threaded set pin 125. Each longitudinal bore 136 within the respective pin guide 160 opens briefly into the interior of the header assembly 120 such that when set pins 125 are inserted into the pin guides 160, the pins also pass through turn-guide slots of the rotatable valve assembly 130, thereby securing the rotatable valve assembly 130 in place. The rotatable valve assembly 130 can be rotated by turning the turn knob 131, and the valve assembly 130 will still remain secured by the set pins 125, which pass through portions of the turn-guide slots. The spiral configuration of the turn-guide slots, however, enables the rotatable valve assembly 130 and the attached filter element assembly 140 to rise or descend as it is turned, which in turn opens and closes a backwash fluid drain port. The rotatable valve assembly 130 and filter element assembly 140 can be detached from the filter housing assembly by removing the set pins 125 from the pin guides 160.

The backwashing filter apparatus and method disclosed herein are subject to application and modification by those of ordinary skill in the art. Although the present invention has been described in terms of an exemplary embodiment, it is not limited to these embodiments and modifications. Alternative embodiments, modifications, and equivalents, which would still be encompassed by the invention, may be made by those of ordinary skill in the art, in light of the foregoing teachings. Therefore, the following claims are intended to cover any alternative embodiments, modifications, or equivalents which may be included within the spirit and scope of the invention defined by the claims.

What is claimed is:

1. A backwash, flushing filter assembly comprising:
   a header assembly wherein the header assembly includes a cylinder cap having at least one pin guide, a cylinder base with threaded connector means disposed within the interior circumference of the cylinder base, a fluid inlet connect and a filtered fluid outlet connect;
   a rotatable valve assembly which is slidably connected to the header assembly wherein the rotatable valve assembly includes an interior chamber with a backwash fluid inlet port, a filtered fluid outlet port, and at least one seal gasket;
   a filter element assembly which is releasably connected to the rotatable valve assembly wherein the filter element assembly includes, a filter stalk with filter ports formed in the filter stalk, and a filter media disposed around the exterior of the filter stalk; and,
   a filter housing assembly which is releasably connected to the header assembly wherein the filter housing assembly includes a filter housing and a backwash drain port, wherein said backwash drain port is located at the bottom of the filter housing;
   further wherein the rotatable valve assembly further includes a turn knob and an inclined turn guide slot formed on the exterior circumference of the rotatable valve assembly, thereby enabling the filter stalk to be adjustably secured within the filter housing yet axially movable by rotation of the rotatable valve assembly;
   further wherein the rotatable valve assembly is rotatable between a filtration position and a backwash position located one-quarter turn from the filtration position, such that in the filtration position the gasket stem of the filter element assembly covers the backwash drain port at the bottom of the filter housing, and such that in the backwash position the backwash drain port is uncovered by the gasket stem of the filter element assembly; and,
   further wherein at least one set pin is inserted through at least one pin guide on the cyclinder cap and mates to the turn guide slot of the rotatable valve assembly.

2. The assembly of claim 1 wherein said at least one set pin detachably secures the filter housing with the rotatable valve assembly.

3. A backwash, flushing filter assembly comprising:
   a header assembly wherein the header assembly includes a cylinder cap, a cylinder base with threaded connector means disposed within the interior circumference of the cylinder base, a fluid inlet connect, a filtered fluid outlet connect, at least one pin guide on the cylinder cap, and at least one removable set pin inserted within each pin guide;
   a rotatable valve assembly which is slidably connected to the header assembly wherein the rotatable valve assembly includes an interior chamber with a backwash fluid inlet port and a filtered fluid outlet port, a top filter coupler and a turn guide slot for mating with the at least one removable set pin when inserted within its corresponding pin guide;
   a filter element assembly which is releasably connected to the rotatable valve assembly wherein the filter element assembly includes a lower filter coupler, a filter stalk with filter ports formed in the filter stalk, and a filter media disposed around the exterior of the filter stalk; and,
   a filter housing assembly which is releasably connected to the header assembly wherein the filter housing assembly includes a filter housing and a backwash drain port, wherein said backwash drain port is located at the bottom of the filter housing;
   further wherein the turn guide slot is an inclined slot about the external surface of the rotatable valve assembly, thereby enabling the filter stalk to be adjustably secured within the filter housing yet axially movable by rotation of the rotatable valve assembly; and further wherein the rotatable valve assembly is rotatable between a filtration position and a backwash position located one-quarter turn from the filtration position, such that in the filtration position the gasket stem of the filter element assembly covers the backwash drain port at the bottom of the filter housing, and such that in the backwash position the backwash drain port is uncovered by the gasket stem of the filter element assembly.

* * * * *